Patented Oct. 14, 1941

2,258,755

UNITED STATES PATENT OFFICE 2,258,755

PROCESS FOR THE MANUFACTURE OF DYED GELATIN LAYERS FOR PHOTOGRAPHIC PURPOSES

Erich Glaser, Brussels-Uccle, Belgium, assignor, by mesne assignments, to Chromogen, Incorporated, a corporation of Nevada No Drawing. Application June 19, 1939, Serial No. 279,994. In Germany June 23, 1938

7 Claims. (Cl. 95—7)

It is known that gelatin layers containing dyes or light-sensitive layers containinng dyes may be used for photographic purposes, particularly in color-photography. Various processes of incorporating the dyes in the layers are known. Thus, for example, the dye has been synthesized in the gelatin solution from its components, or the final dye has been dissolved in the gelatin solution. In those cases where the solubility properties of the dye do not readily permit of this incorporation, it has been the practice to distribute pigments finely in the gelatin solution, employing to this end wetting and dispersing agents, where necessary in conjunction with mechanical grinding; or the incorporation of the dye has been effected by the addition of an auxiliary solvent, such as alcohol and acetone. The incorporation of insoluble dyes in the form of their soluble derivatives and the splitting up of the latter in the gelatin solution or in the silver halide emulsion has been described in my prior U. S. Letters Patents Nos. 2,172,307, dated September 5, 1939, and 2,172,308, dated September 5, 1939. According to the disclosures of these patents soluble bisulphite compounds or aldehyde-bisulphite compounds of azo dyes are added to the gelatin or to the silver halide emulsion, or omega sulphonic acid salts of polyazo dyes containing amino groups, or sulphaminic acid salts are used for the same purpose. Furthermore, the soluble derivatives of insoluble dye components can be used in which case, for instance, the bisulphite compounds or the aldehyde-bisulphite compounds or the acid esters of insoluble dye components are split up in the gelatin solution into the components, and the latter are then employed to produce the dye.

The present invention relates to a process that may be used in any of the cases mentioned above or in similar cases, in particular when the solubility of the coloring-matter (the term including dyes, dye derivatives, dye components or their derivatives) is insufficient to ensure the dissolving in the gelatin solution of a quantity of the coloring matter adequate to ensure an intensive coloring.

The present invention comprises the preparation of a dilute aqueous solution containing the sparingly water-soluble coloring-matter and the gelatin in approximately the same proportion as that in which the dye and the gelatin are to be present in the final colored gelatin layer (with due regard, if necessary, to the quantity of gelatin that might have to be added later). On the other hand, the water content of the gelatin solution is increased to an extent required for dissolving substantially the whole of the coloring-matter. On account of its great dilution, a solution of this character is unsuitable for coating immediately on the support, and according to the invention is subjected to a special treatment which results in the gelatin being flocculated while at the same time the coloring-matter is precipitated. The most suitable of the electrolytes added for this purpose to the aqueous gelatin solution is ammonium sulphate either in dry form or in the form of a solution.

It is already known that it is possible to separate gelatin out of its solutions by flocculation with ammonium sulphate. It was however not known that this phenomenon might be employed to intensify the concentration of coloring-matters in the gelatin, and in particular to incorporate in the gelatin substances that in themselves are of poor solubility. The use of such poorly or sparingly water-soluble coloring-matters is however highly desirable in view of their low tendency to diffuse or bleed in the course of the further treatment of the colored material.

The invention is practised in a variety of manners, according to the nature of the coloring-matter to be incorporated in the gelatin solution. If it is a matter of incorporating a ready-made dye, and for instance 2 grams of the dye are to be incorporated in 100 ccs. of a 10% gelatin solution, whereas the dye requires 500 ccs. of water to be completely dissolved, then the dye is dissolved in that quantity of water and 10 grams of gelatin are added to the solution, or 100 ccs. of a 10% gelatin solution are diluted five-fold and the dye then dissolved in the diluted solution. The addition of ammonium sulphate causes dyed gelatin to separate out in flakes, while the surplus water remains practically colorless. The dyed gelatin is subsequently melted and if necessary water is added to bring it to a concentration of 10% gelatin. In this state the solution may be used for preparing anti-halation or filter layers, or mixed with silver halide emulsion to produce light-sensitive layers.

If it is a matter of incorporating a dye indirectly through a component, the process adopted will depend on the nature of the further treatment. For instance, if the dye is to be produced from the component within the coated layer, especially after the exposure of the light-sensitive material, the process is the same as described above for a dyed layer. On the other hand, if the gelatin solution or emulsion is to be dyed prior to the coating, it is more practical to convert the dye-forming substance to a dye within the dilute gelatin solution, and afterwards to precipitate the final dye together with the gelatin by the addition of ammonium sulphate or other suitable electrolyte. The subsequent processing may then be effected in the same manner as with a gelatin solution dyed with the dye itself. When splittable dye derivatives are employed, it is also possible to form the dye from the derivative in the dilute gelatin solution or in the layer itself. Particularly in the case of dye synthesis or the splitting of dye derivatives, it is to be recommended that the coagulated gelatin be washed with water before being melted in order to remove from the gelatin any extraneous substances formed in the chemical process, as well as the electrolytes which should in every case be removed from the dyed gelatin. The coloring-matters employed in the process of the invention should preferably possess the property of being precipitated by the same agent as is employed to flocculate the gelatin. In addition, suitable dyes are those which have the property of being only with difficulty washed out of gelatin.

Example 1

To obtain a dyed silver halide emulsion layer of an area of one square metre and consisting of 250 ccs. of emulsion containing 1 gram of the dye Chloramin Rot BK (a red dye marketed by the Chemische Fabrik vormals Sandoz of Basle, Switzerland), the following procedure is adopted:

The final emulsion is made from a mixture of 150 ccs. of an undyed silver halide gelatin emulsion and 100 ccs. of a 10% gelatin solution containing the dye. The amount of 1 gram dye necessary for the desired coloring of the emulsion must therefore be incorporated in these 100 ccs. gelatin solution. The dye Chloramin Rot is so poorly or sparingly water soluble in water that 1 gram thereof cannot be dissolved in 100 ccs. of a 10% gelatin solution or in the 90 ccs. of water used for its preparation. Accordingly, 1 gram of the dye is dissolved in 1,000 ccs. of water and then there are added 10 grams of gelatin that has been soaked in water. Ammonium sulphate is gradually added to the dilute dyed gelatin solution until complete flocculation of the gelatin has been obtained and the remaining liquid is practically colorless. The floccules are thoroughly washed and then melted by being gently warmed. Sufficient water is then added to the 70 to 90 grams of dyed gelatin thus obtained to bring the total volume up to 100 ccs. These 100 ccs. are then mixed with silver halide emulsion and 250 ccs. of a colored emulsion are obtained which are coated on a surface of one square metre.

Example 2

In place of the dye mentioned in Example 1, a dye-forming substance, e. g. the practically colorless Diazolichtgelb 2G (Schultz Farbstofftabellen, Leipzig 1931, 7th ed., vol. I, No. 749) is incorporated in the gelatin solution in a manner analogous to that described in the foregoing example, and the gelatin solution is then used for the production of a silver halide emulsion layer.

Example 3

In place of the dye mentioned in Example 1, the bisulphite compound of the insoluble dye Parared (Schultz, 1. c., No. 60) is used. A dilute gelatin solution containing this compound is prepared, thereafter rendered slightly alkaline by the addition of caustic soda, and allowed to stand until the red dye has formed. The gelatin is flocculated and used as described in Example 1.

What is claimed is:

1. A process for producing colloid layers which comprises the steps of preparing an aqueous solution of a colloid and a sparingly water-soluble substance selected from the group consisting of dyes, dye-forming substances, splittable dye derivatives and splittable derivatives of dye-forming substances, said solution containing sufficient water to dissolve substantially all of said sparingly water-soluble substance and to form a solution having a relatively low concentration of said substance, treating the aqueous solution with an electrolyte to flocculate the colloid together with substantially all of said substance, separating the flocculate from the aqueous phase, washing and melting the flocculate and coating it on to a carrier.

2. A process for producing gelatin layers which comprises the steps of preparing an aqueous solution of gelatin and a sparingly water-soluble substance selected from the group consisting of dyes, dye-forming substances, splittable dye derivatives and splittable derivatives of dye-forming substances, said solution containing sufficient water to dissolve substantially all of said sparingly water-soluble substance and to form a solution having a relatively low concentration of said substance, treating the aqueous solution with an electrolyte to flocculate the gelatin together with substantially all of said substance, separating the flocculate from the aqueous phase, washing and melting the flocculate and coating it on to a carrier.

3. A process for producing gelatin layers which comprises the steps of preparing an aqueous solution of gelatin and a sparingly water-soluble substance selected from the group consisting of dyes, dye-forming substances, splittable dye derivatives and splittable derivatives of dye-forming substances, said solution containing sufficient water to dissolve substantially all of said sparingly water-soluble substance and to form a solution having a relatively low concentration of said substance, treating the aqueous solution with ammonium sulfate to flocculate the gelatin together with substantially all of said substance, separating the flocculate from the aqueous phase, washing and melting the flocculate and coating it on to a carrier.

4. A process for producing light-sensitive silver halide gelatin layers comprising the steps of preparing an aqueous solution of gelatin and a sparingly water-soluble substance selected from the group consisting of dyes, dye-forming substances, splittable dye derivatives and splittable derivatives of dye-forming substances, said solution containing sufficient water to dissolve substantially all of said sparingly water-soluble substance and to form a solution having a relatively low concentration of said substance, treating the aqueous solution with an electrolyte to flocculate the gelatin together with substantially all of said substance, separating the flocculate from the aqueous phase, washing and melting the flocculate, incorporating a light-sensitive silver halide and coating it on to a carrier.

5. A process for producing light-sensitive silver halide gelatin layers comprising the steps of preparing an aqueous solution of gelatin and a sparingly water-soluble substance selected from the group consisting of dyes, dye-forming substances, splittable dye derivatives and splittable derivatives of dye-forming substances, said solution containing sufficient water to dissolve substantially all of said sparingly water-soluble substance and to form a solution having a relatively low concentration of said substance, treating the aqueous solution with ammonium sulfate to flocculate the gelatin together with substantially all of said substance, separating the flocculate from the aqueous phase, washing and melting the flocculate, incorporating a light-sensitive silver halide and coating it on to a carrier.

6. A process for producing light-sensitive silver halide colloid layers comprising the steps of preparing an aqueous solution of a colloid and a sparingly water-soluble substance selected from the group consisting of dyes, dye-forming substances, splittable dye derivatives and splittable derivatives of dye-forming substances, said solution containing sufficient water to dissolve substantially all of said sparingly water-soluble substance and to form a solution having a relatively low concentration of said substance, treating the aqueous solution with an electrolyte to flocculate the colloid together with substantially all of said substance, separating the flocculate from the aqueous phase, washing and melting the flocculate, incorporating a light-sensitive silver halide and coating it on to a carrier.

7. A process for producing colloid layers which comprises the steps of preparing an aqueous solution of a colloid and a sparingly water-soluble substance selected from the group which consists of dye-forming substances, splittable dye-derivatives, splittable derivatives of dye-forming substances, said solution containing sufficient water to dissolve substantially all of said sparingly water-soluble substance and to form a solution having a relatively low concentration of said substance, transformig said substance into a dye, treating the aqueous solution with an electrolyte to flocculate the colloid together with substantially all of said substance, separating the flocculate from the aqueous phase, washing and melting the flocculate and coating it on to a carrier.

ERICH GLASER.